United States Patent
Sugisawa

(10) Patent No.: US 7,117,074 B2
(45) Date of Patent: Oct. 3, 2006

(54) METHOD AND APPARATUS FOR ALARMING DECREASE IN TIRE AIR-PRESSURE AND PROGRAM FOR ALARMING DECREASE IN TIRE AIR-PRESSURE

(75) Inventor: Toshifumi Sugisawa, Kobe (JP)

(73) Assignee: SRI Sports Limited, Kobe (JP)

( * ) Notice: Subject to any disclaimer, the term of this patent is extended or adjusted under 35 U.S.C. 154(b) by 148 days.

(21) Appl. No.: 10/790,048

(22) Filed: Mar. 2, 2004

(65) Prior Publication Data
US 2004/0176888 A1 Sep. 9, 2004

(30) Foreign Application Priority Data
Mar. 3, 2003 (JP) ............................. 2003-055498

(51) Int. Cl.
*G06F 7/00* (2006.01)
*B60C 23/02* (2006.01)
(52) U.S. Cl. .................. 701/29; 701/36; 73/146.2; 116/34 R; 340/442
(58) Field of Classification Search ............ 701/29–36; 73/146.2; 116/34 R; 340/444, 442
See application file for complete search history.

(56) References Cited

U.S. PATENT DOCUMENTS 5,531,110 A * 7/1996 Ohashi et al. ................ 73/146

6,002,327 A 12/1999 Boesch et al.
6,323,765 B1 * 11/2001 Horie et al. ................ 340/442

FOREIGN PATENT DOCUMENTS

| EP | 0 554 131 A1 | 8/1993 |
|---|---|---|
| EP | 0 773 118 A1 | 5/1997 |
| EP | 1 145 875 A2 | 10/2001 |
| JP | 6-8713 A | 1/1994 |
| JP | 6-8714 A | 1/1994 |
| JP | 7-198520 A | 8/1995 |
| JP | 9-203678 A | 8/1997 |

* cited by examiner

*Primary Examiner*—Yonel Beaulieu
(74) *Attorney, Agent, or Firm*—Birch, Stewart, Kolasch & Birch, LLP

(57) ABSTRACT

A method for alarming decrease in tire air-pressure in which decrease in tire air-pressure is determined on the basis of rotational velocity information of a wheel of a vehicle. Respective thresholds for determining whether judgment of decrease in tire air-pressure is to be made or not are changed depending on magnitude of driving torque of the vehicle when the vehicle is performing turning movements. It is possible to improve the detection accuracy without issuing an erroneous alarm even in the case where a large driving force is applied when the vehicle is, for instance, running on a climbing road or when it performs trailer towing.

5 Claims, 3 Drawing Sheets

METHOD AND APPARATUS FOR ALARMING DECREASE IN TIRE AIR-PRESSURE AND PROGRAM FOR ALARMING DECREASE IN TIRE AIR-PRESSURE

This Nonprovisional application claims priority under 35 U.S.C. §119(a) on Patent Application No(s). 2003-055498 filed in JAPAN on Mar. 3, 2003, the entire contents of which are hereby incorporated by reference.

BACKGROUND OF THE INVENTION

The present invention relates to a method and apparatus for alarming decrease in tire air-pressure and a program for alarming decrease in tire air-pressure. More particularly, it relates to a method and apparatus for alarming decrease in tire air-pressure and a program for alarming decrease in tire air-pressure with which it is possible to improve the detection accuracy without issuing an erroneous alarm even in the case where a large driving force is applied when the vehicle is, for instance, running on a climbing road or when it performs trailer towing.

While various methods for detecting decompression of a tire attached to a vehicle have been suggested so far, the applicant of the present invention suggests a method for detecting decompression in which judgment of decrease in air-pressure can be performed by using a "turning correction logic" also during turning movements of the vehicle (see Japanese Unexamined Patent Publications No. 8713/1994 and No. 8714/1994).

According to the methods for detecting decompression as recited in Japanese Unexamined Patent Publications No. 8713/1994 and No. 8714/1994, decompression of a tire is detected upon comparing angular velocity signals from wheel speed sensors attached to each wheel. More particularly, wheel speed sensors composed of gearings provided with a magnetic pickup are employed for measuring respective wheel speed values C1, C2, C3 and C4 of the four wheels, and these values C1, C2, C3 and C4 are substituted into the following equation (1) for obtaining an error value DEL'.

$$DEL' = [(C1+C4)/2 - (C2+C3)/2] \times 100 / [(C1+C2+C3+C4)/4] \quad (1)$$

The error value DEL' is then substituted into the following equation (2) for the "turning correction logic" for obtaining a corrected error value DEL.

$$DEL = DEL' - LAT \times A (\approx DEL' - \text{lateral } G \times \quad (2)$$
$$(\text{correction coefficient 1} + \text{slip rate} \times$$
$$\text{correction coefficient 2}))$$

When it is detected that the corrected value falls within a range of a specified threshold of 0.05 to 0.5, a tire alarm indicator within the vehicle is actuated for indicating that at least one tire has been detected.

However, where a large driving force is required, for instance, when running up a steep climb or when performing trailer towing, it would happen that such corrections could not be sufficiently performed particularly in the driving wheels so that erroneous alarm was apt to happen.

One possible factor thereof might be that a large slip is generated at the tire upon application of large driving force during turning movements so that corrections cannot be sufficiently performed by the above equation for turning correction alone.

SUMMARY OF THE INVENTION

The present invention has been made for solving such problems, and it is an object thereof to provide a method and apparatus for alarming decrease in tire air-pressure and a program for alarming decrease in tire air-pressure with which it is possible to improve the detection accuracy without issuing erroneous alarm even in the case where a large driving force is applied when the vehicle is, for instance, running on a climbing road or when it performs trailer towing.

According to a first aspect of the present invention, there is provided a method for alarming decrease in tire air-pressure in which decrease in tire air-pressure is determined on the basis of rotational velocity information of a wheel of a vehicle, wherein respective thresholds for determining whether judgment of decrease in tire air-pressure is to be made or not are changed depending on magnitude of driving torque of the vehicle when the vehicle is performing turning movements.

According to a second aspect of the present invention, there is provided an apparatus for alarming decrease in tire air-pressure in which decrease in tire air-pressure is determined on the basis of rotational velocity information of a wheel of a vehicle. The apparatus includes velocity detecting means which detect wheel speeds of the respective tires, a judging means which judges decrease in tire air-pressure on the basis of the wheel speeds detected by the velocity detecting means, and an alarming means which issues an alarm when a decrease in tire air-pressure is judged in the judging means. The apparatus further includes a threshold changing means which changes respective thresholds for determining whether judgment of decrease in tire air-pressure is to be made or not depending on magnitude of driving torque of the vehicle when the vehicle is performing turning movements.

It is preferable that the apparatus includes:

an engine torque detecting means which detects an engine torque of the vehicle, an engine rotational number detecting means or a shift position detecting means which detects an engine rotational number of the vehicle, and a lateral directional acceleration detecting means which detects a lateral direction acceleration of the vehicle, wherein a driving force applied onto tires of driving wheels is obtained on the basis of the engine torque, the engine rotational number or shift position, wheel rotational numbers as calculated from the wheel speeds detected by the velocity detecting means, and a tire radius, wherein a turning force applied onto the tires of the driving wheels is obtained from the lateral directional acceleration, and wherein a magnitude of force acting on the driving wheels is obtained from the driving force and the turning force.

It is preferable that the apparatus includes:

an engine torque detecting means which detects an engine torque of the vehicle, an engine rotational number detecting means or a shift position detecting means which detects an engine rotational number of the vehicle, and a lateral directional acceleration detecting means which detects a lateral directional acceleration of the vehicle, wherein a driving force applied onto tires of driving wheels is obtained on the basis of the engine torque, the engine rotational number or shift position, wheel rotational numbers as calculated from the wheel speeds detected by the velocity detecting means, and a tire radius, and wherein a magnitude of force acting on the driving wheels is obtained from the driving force and the lateral directional acceleration.

According to a third aspect of the present invention, there is provided a program for alarming decrease in tire air-pressure wherein, for issuing an alarm of decrease in tire air-pressure of a vehicle, a computer is made to function as a judging means which judges decrease in tire air-pressure on the basis of wheel speeds detected by velocity detecting means, and a threshold changing means which changes respective thresholds for determining whether judgment of decrease in tire air-pressure is to be made or not depending on magnitude of driving torque of the vehicle when the vehicle is performing turning movements.

DETAILED DESCRIPTION

Figure 1:
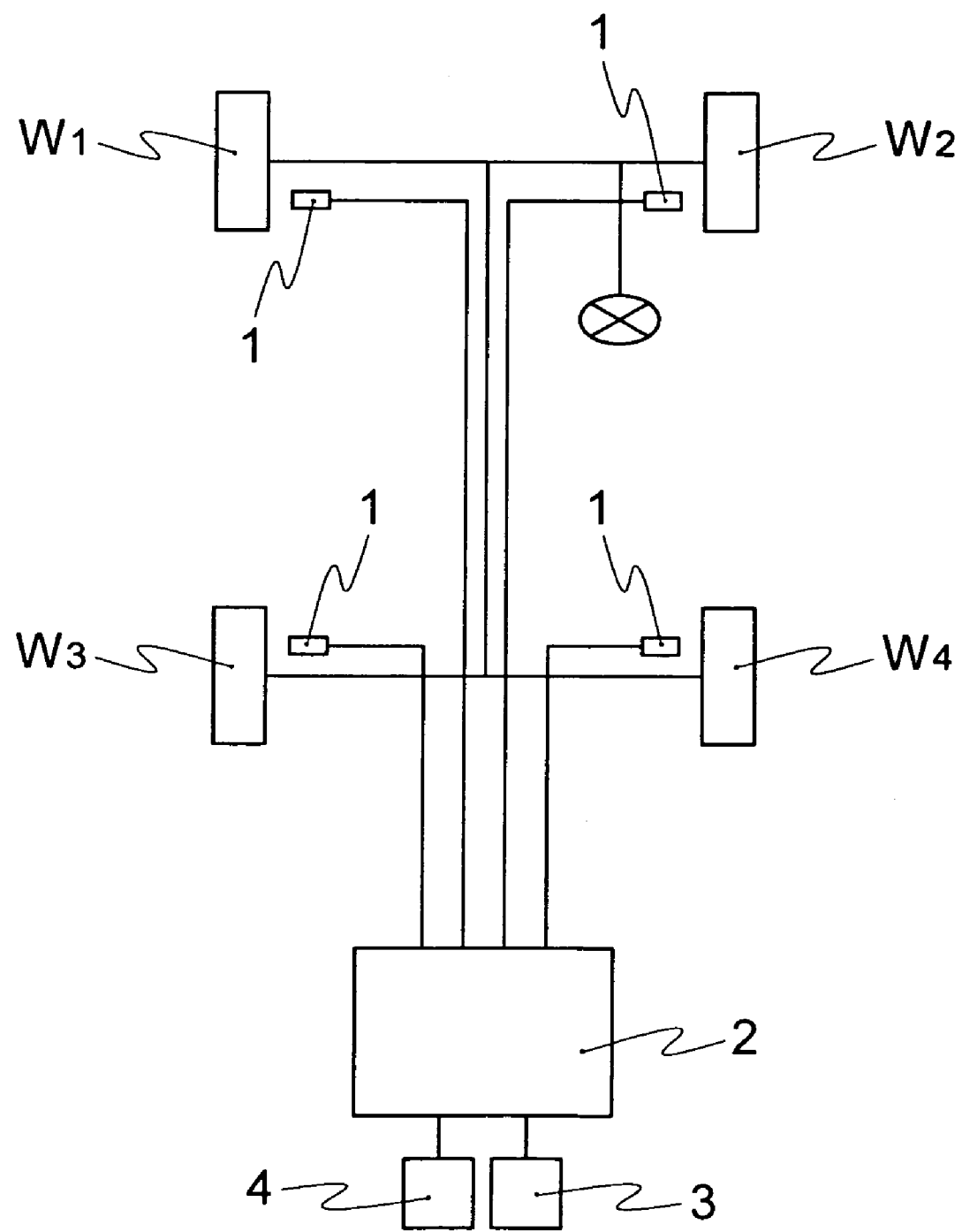
FIG. 1 is a block diagram illustrating one embodiment of the apparatus for alarming decrease in tire air-pressure according to the present invention.

The method and apparatus for alarming decrease in tire air-pressure and the program for alarming decrease in tire air-pressure according to the present invention will now be explained in details while referring to the drawings.

Figure 2:
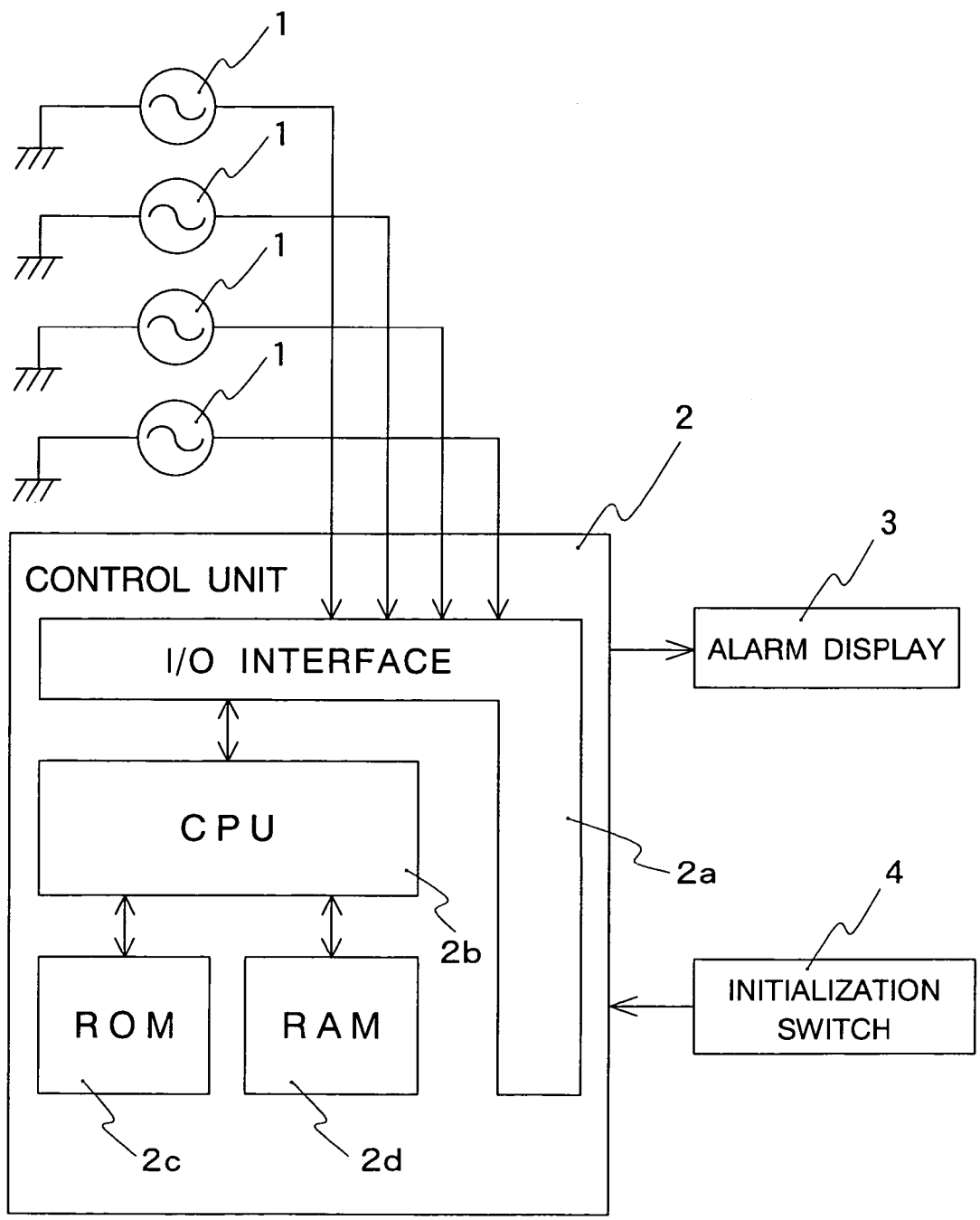
FIG. 2 is a block diagram illustrating electric arrangements of the apparatus for alarming decrease in tire air-pressure of FIG. 1.

As illustrated in FIGS. 1 and 2, the apparatus for detecting decrease in tire air-pressure according to one embodiment of the present invention is for judging whether air-pressure of either of four tires $W_1$, $W_2$, $W_3$ and $W_4$ provided in a four-wheeled vehicle is decreased or not, and includes ordinary wheel speed sensors 1 respectively provided in relation to the respective tires $W_1$, $W_2$, $W_3$ and $W_4$. Outputs of the wheel speed sensors 1 are supplied to a control unit 2. An alarm display 3 composed of liquid crystal elements, plasma display elements or CRT for informing a tire $W_i$ of which the tire air-pressure has decreased, and an initialization switch 4 which might be operated by a driver are connected to the control unit 2.

The control unit 2 includes an I/O interface 2a required for sending/receiving signals to/from an external device, a CPU 2b which functions as a center of calculation, a ROM 2c which stores a control operation program for the CPU 2b, and a RAM 2d into which data are temporally written and are read out therefrom when the CPU 2b performs control operations.

Pulse signals corresponding to the rotational number of the tire $W_i$ (hereinafter referred to as "wheel speed pulse") are output from the wheel speed sensors 1. In the CPU 2b, wheel rotational numbers $N_W$ for the respective tires $W_i$ are calculated on the basis of the wheel speed pulses as output from the wheel speed sensors at specified sampling periods $\Delta T$ (sec), for instance, $\Delta T=1$.

Though not illustrated, an engine torque detecting means such as a conventionally known torque sensor is provided for detecting an engine torque $T_E$.

Further, though not illustrated, an conventionally known engine rotational number detecting means is provided for detecting an engine rotational number $N_E$, and a lateral directional acceleration detecting means such as a conventionally known G sensor is provided for detecting a lateral directional acceleration $A_L$ (so-called lateral G).

Figure 3:
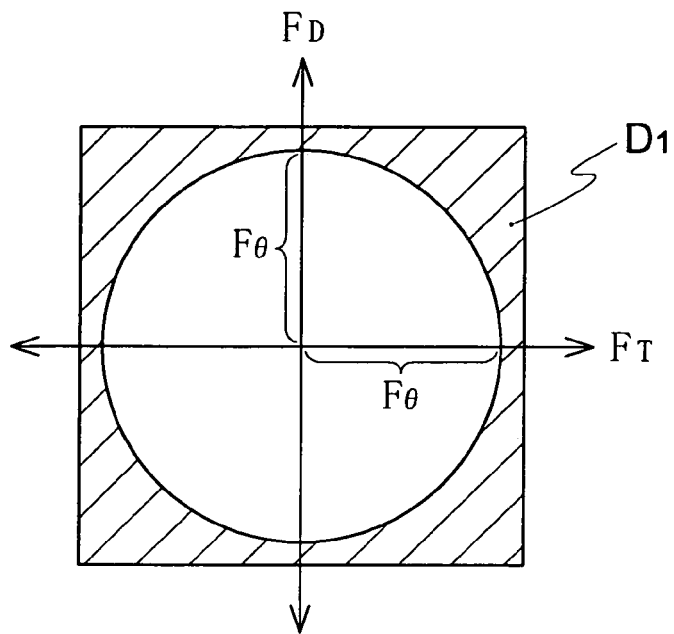
FIG. 3 is a graph for illustrating a region $D_1$ in which no judgment of decrease in tire air-pressure is performed according to one embodiment of the method for alarming decrease in tire air-pressure of the present invention.

While the force applying on the driving wheel tires is composed of a sum of driving force in front and rear directions and turning force in lateral directions (cornering force), the driving force in front and rear directions can be obtained as a driving force applied onto one wheel from the engine torque information obtained from the engine, and the turning force can be obtained from the lateral G and a weight of a driving shaft. Representing a relationship of these by means of an equation, it would be (sum $F_{sum}$ of force acting on the driving wheel tires)$^2$=driving force $F_D^2$+turning force $F_T^2 (\geq$ (threshold $F_\theta)^2)$ (3)

and the graph as illustrated in FIG. 3 can be obtained.
Here,

Driving force $F_D(N)$=engine torque $T_E(Nm)$×(engine rotational number $N_E$÷wheel rotational number $N_W$)÷tire radius $R_T(m)$÷driving wheel number $n$ (4)

Turning force $F_T(N)$=lateral directional acceleration $A_L(m/sec^2)$×driving wheel shaft weight $W_D(kg)$ (5)

In this respect, the engine torque $T_E$ can also be obtained from an engine control unit through a communication line such as a CAN (car-mounted network) besides the above-described, and the value of (engine rotational number $N_E$÷wheel rotational number $N_W$) can be obtained from a reduction ratio of a driving system or from a gear ratio of a transmission.

Where the thus obtained sum $F_{sum}$ acting on the tire is not more than the threshold $F_\theta$, judgment of decrease in tire air-pressure is performed. On the other hand, where the sum $F_{sum}$ acting on the tire has exceeded the threshold $F_\theta$, no judgment of decrease in tire air-pressure is performed. More particularly, when the vehicle is in a condition of the hatched region $D_1$ in FIG. 3 (that is, where sum $F_{sum}$ acting on the tire>threshold $F_\theta$), no judgment of decrease in air-pressure shall be performed. With this arrangement, it is possible to improve the detection accuracy without issuing an erroneous alarm even in the case where a large driving force is applied when running on a climb road or when performing trailer towing.

The threshold $F_\theta$ can be obtained through actual vehicle tests or on the basis of tire characteristic data (μ-S, CF etc.) obtained through bench tests.

The above-mentioned program for performing the method for alarming decrease in tire air-pressure might be stored, for instance, in the ROM 2c as illustrated in FIG. 1, and for issuing an alarm of decrease in tire air-pressure of the vehicle, the CPU 2b of the computer might be made to function as the judging means which judges decrease in tire air-pressure on the basis of wheel speeds detected by the velocity detecting means, and the threshold changing means which changes respective thresholds for determining whether judgment of decrease in tire air-pressure is to be made or not depending on the magnitude of driving torque of the vehicle when the vehicle is performing turning movements.

Figure 4:
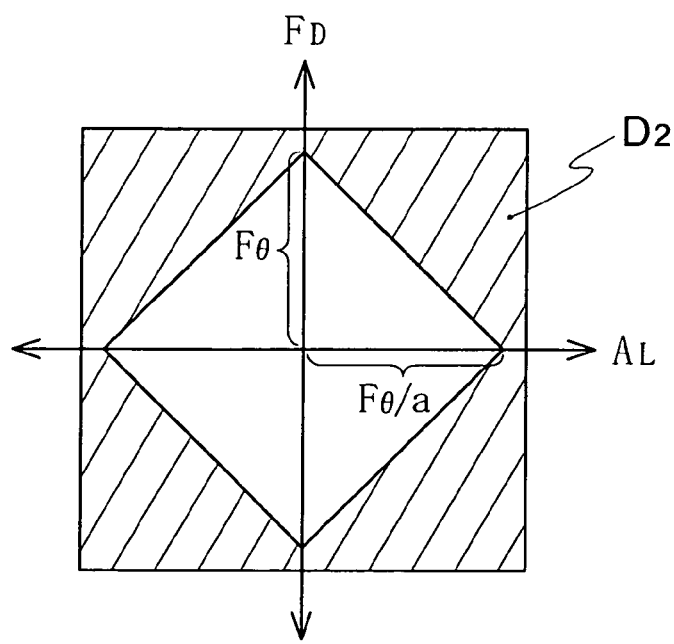
FIG. 4 is a graph for illustrating a region $D_2$ in which no judgment of decrease in tire air-pressure is performed according to one embodiment of the method for alarming decrease in tire air-pressure of the present invention.

In this respect, it is difficult to exactly obtain the turning force $F_T$, and it is actually necessary to take a load shift during turning, a slip angle, or a structure of a suspension into consideration. Accordingly, in another embodiment of the present invention, it is possible to replace the turning force $F_T$ by lateral directional acceleration $A_L$ or to perform linear replacement. In this case, where $$|\text{driving force } F_D(N) + \text{coefficient } a \times \text{lateral directional acceleration } A_L(m/sec^2)| \geq \text{threshold } F_\theta \quad (6)$$

is satisfied (that is, in a condition of the hatched region $D_2$ in FIG. 4), no judgment of decrease in tire air-pressure is performed. Here, the driving force $F_D$ and the lateral directional acceleration $A_L$ can be obtained similar to the above-mentioned embodiment.

In this respect, this equation can be rewritten as $$|\text{lateral directional acceleration } A_L(m/sec^2)| \geq (\text{threshold } F_\theta - \text{driving force } F_D(N))/\text{coefficient } a \quad (7)$$

This means, in other words, that the threshold $F_\theta$ of the lateral directional acceleration $A_L$ with which no judgment of decrease in air-pressure is performed is changed depending on the value of the driving force $F_D$ of the engine. By performing such control, it is possible to improve the detection accuracy without issuing an erroneous alarm even in the case where a large driving force is applied when the vehicle is, for instance, running on a climbing road or when it performs trailer towing.

When the program for performing the method for alarming decrease in tire air-pressure is also stored in the ROM 2c as illustrated in FIG. 1, the CPU 2b of the computer might be made to function as the judging means which judges decrease in tire air-pressure on the basis of wheel speeds detected by the velocity detecting means, and the threshold changing means which changes respective thresholds for determining whether judgment of decrease in tire air-pressure is to be made or not depending on the magnitude of driving torque of the vehicle when the vehicle is performing turning movements for issuing an alarm of decrease in tire air-pressure of the vehicle.

The number of occurrences of an erroneous alarm were investigated by performing the embodiment according to the method for alarming decompression of tire of the present invention and by performing a Comparative Example according to a conventional method in which only turning correction is performed under the same conditions. The test results are as shown in Table 1 below.

In this respect, the test conditions were such that the vehicle used was a passenger car of FF2400 cc, the used tires were 215/55R16 (summer tires manufactured by Sumitomo Rubber Industries, Ltd. (Trade name: LM702)), and tests were performed on a flat winding road and a climb winding road (gradient of 20%), respectively, for performing the tests. Occurrences of an alarm were compared between cases in which all of the four wheel tires were at normal internal pressure and in which only the front left wheel was decompressed by 40% when compared to normal internal pressure.

TABLE 1

|  | Flat Winding Road | | Climb Winding Road (gradient of 20%) | |
| --- | --- | --- | --- | --- |
|  | Normal Internal Pressure | Front Left Wheel (decompression by 40%) | Normal Internal Pressure | Front Left Wheel (decompression by 40%) |
| Example | No Alarm | Alarm (57 seconds) | No Alarm | Alarm (86 seconds) |
| Comparative Example | No Alarm | Alarm (57 seconds) | Alarm (erroneous) (320 seconds) | Alarm (72 seconds) |

It can be understood from Table 1 that while an erroneous alarm is generated on the 20% climb winding road on which a large driving force is applied to the driving wheels in the Comparative Example in which only turning correction is performed, no erroneous alarm is generated in the embodiment according to the method of the present invention.

According to the present invention, it is possible to improve the detection accuracy without issuing an erroneous alarm even in the case where a large driving force is applied when the vehicle is, for instance, running on a climbing road or when it performs trailer towing.

What is claimed is:

1. A method for alarming decrease in tire air-pressure in which decrease in tire air-pressure is determined on the basis of rotational velocity information of a wheel of a vehicle and no judgment of decrease in air-pressure is performed when ((sum $F_{sum}$ of force acting on the driving wheel tires)$^2$= (driving force $F_D$)$^2$+(turning force $F_T$)$^2 \geq$(threshold $F_\theta$)$^2$) or (driving force $F_D$+coefficient a X lateral directional acceleration $A_L | \geq$ threshold $F_\theta$) is satisfied, comprising:

obtaining respective thresholds for determining whether judgment of decrease in tire air-pressure is to be made or not; and changing the respective thresholds of the above formulas depending on magnitude of driving torque of the vehicle when the vehicle is performing turning movements.

2. An apparatus for alarming decrease in tire air-pressure in which decrease in tire air-pressure is determined on the basis of rotational velocity information of a wheel of a vehicle and no judgment of decrease in air-pressure is performed when ((sum $F_{sum}$ of force acting on the driving wheel tires)$^2$=(driving force $F_D$)$^2$+(turning force $F_T$)$^2 \geq$ (threshold $F_\theta$)$^2$) or (driving force $F_D$+coefficient a X lateral direction acceleration $A_L | \geq$ threshold $F_\theta$) is satisfied, comprising:

velocity detecting means which detect wheel speeds of the respective tires, a judging means which judges decrease in tire air-pressure on the basis of the wheel speeds detected by the velocity detecting means, and an alarming means which issues an alarm when a decrease in tire air-pressure is judged in the judging means, wherein the apparatus further comprises a threshold changing means which changes respective thresholds for determining whether judgment of decrease in tire air-pressure is to be made or not depending on magnitude of driving torque of the vehicle when the vehicle is performing turning movements.

3. The apparatus of claim 2, wherein the apparatus further comprises an engine torque detecting means which detects an engine torque of the vehicle, an engine rotational number detecting means or a shift position detecting means which detects an engine rotational number of the vehicle, and a lateral directional acceleration detecting means which detects a lateral direction acceleration of the vehicle, wherein a driving force applied onto tires of driving wheels is obtained on the basis of the engine torque, the engine rotational number or shift position, wheel rotational numbers as calculated from the wheel speeds detected by the velocity detecting means, and a tire radius, wherein a turning force applied onto the tires of the driving wheels is obtained from the lateral directional acceleration, and wherein a magnitude of force acting on the driving wheels is obtained from the driving force and the turning force.

4. The apparatus of claim 2, wherein the apparatus further comprises an engine torque detecting means which detects an engine torque of the vehicle, an engine rotational number detecting means or a shift position detecting means which detects an engine rotational number of the vehicle, and a lateral directional acceleration detecting means which detects a lateral directional acceleration of the vehicle, wherein a driving force applied onto tires of driving wheels is obtained on the basis of the engine torque, the engine rotational number or shift position, wheel rotational numbers as calculated from wheel speeds detected by the velocity detecting means, and a tire radius, and wherein a magnitude of force acting on the driving wheels is obtained from the driving force and the lateral directional acceleration.

5. A system, comprising:

a program embodied in a computer readable medium for issuing an alarm of decrease in tire air-pressure of a vehicle and for not performing judgment of decrease in air-pressure when ((sum $F_{sum}$ of force acting on the driving wheel tires)$^2$=(driving force $F_D$)$^2$+(turning force $F_T$)$^2 \geq$ (threshold $F_\theta$)$^2$) or (driving force $F_D$+coefficient a X lateral directional acceleration $A_L | \geq$ threshold $F_\theta$) is satisfied, said program including:

judging means which judges decrease in tire air-pressure on the basis of wheel speeds detected by velocity detecting means, and a threshold changing means which changes respective thresholds for determining whether judgment of decrease in tire air-pressure is to be made or not depending on a magnitude of driving torque of the vehicle when the vehicle is performing turning movements; and means for not performing judgment of decreases in air-pressure when ((sum $F_{sum}$ of force acting on the driving wheel tires)$^2$=(driving force $F_D$)$^2$++(turning force $F_T$)$^2 \geq$ (threshold $F_\theta$)$^2$) or (driving force $F_D$ coefficient a X lateral directional acceleration $A_L | \geq$ threshold $F_\theta$) is satisfied.

* * * * *